United States Patent [19]
Bjerg

[11] Patent Number: 5,862,742
[45] Date of Patent: Jan. 26, 1999

[54] CANTILEVERED COOKING GRILLS FOR CAMPFIRES

[75] Inventor: Paul A. Bjerg, Sorrento, Canada

[73] Assignee: Russell Bond, Sorrento, Canada

[21] Appl. No.: 970,213

[22] Filed: Nov. 14, 1997

Related U.S. Application Data

[60] Provisional application No. 60/030,822 Nov. 14, 1996.

[51] Int. Cl.⁶ .......................... A47J 37/00; A47J 37/07; F24B 3/00
[52] U.S. Cl. ...................... 99/449; 99/448; 99/450; 126/9 R; 126/25 R; 126/30
[58] Field of Search .............. 99/339, 340, 352, 99/400, 401, 444–446, 448, 449, 450, 481, 482; 126/25 R, 25 A, 9 R, 9 B, 29, 30; 426/523; 211/198, 195, 149, 132; 248/156

[56] References Cited

U.S. PATENT DOCUMENTS

| | | | |
|---|---|---|---|
| 747,700 | 12/1903 | Grimm | 99/449 |
| 2,523,200 | 9/1950 | Durst, Jr. | 126/137 |
| 2,604,884 | 7/1952 | Walker | 126/30 |
| 2,827,846 | 3/1958 | Karkling | 99/339 |
| 2,844,139 | 7/1958 | Lucas | 126/30 |
| 2,912,973 | 11/1959 | Lucas | 126/30 |
| 2,914,283 | 11/1959 | Jorgensen | 248/125 |
| 2,940,439 | 6/1960 | Bartels et al. | 126/30 |
| 2,960,979 | 11/1960 | Stone | 126/25 |
| 2,974,662 | 3/1961 | Forrest | 126/30 |
| 2,977,953 | 4/1961 | Dowdy | 126/30 |
| 3,067,734 | 12/1962 | Lucas | 126/30 |
| 3,152,536 | 10/1964 | Lucas | 99/397 |
| 3,181,453 | 5/1965 | Moran | 99/449 X |
| 3,261,344 | 7/1966 | Petrie | 126/30 |
| 3,344,780 | 10/1967 | Anderson | 126/30 |
| 3,395,692 | 8/1968 | Johns | 126/30 |
| 3,498,210 | 3/1970 | O'Toole | 99/357 |
| 3,526,217 | 9/1970 | Garske | 126/25 |
| 4,065,085 | 12/1977 | Gellatly | 126/30 X |
| 4,094,296 | 6/1978 | Beagly | 126/30 |
| 4,120,280 | 10/1978 | Iverson et al. | 248/168 X |
| 4,351,312 | 9/1982 | Ivy | 126/30 |

(List continued on next page.)

FOREIGN PATENT DOCUMENTS

| | | | |
|---|---|---|---|
| 1170136 | 7/1984 | Canada | 126/104 |
| 1185854 | 4/1985 | Canada | 126/104 |
| 1286936 | 7/1991 | Canada | 126/104 |
| 2030717 | 5/1992 | Canada | 126/104 |

*Primary Examiner*—Timothy F. Simone
*Attorney, Agent, or Firm*—Wells, St. John, Roberts, Gregory & Matkin P.S.

[57] ABSTRACT

Cantilevered cooking grills for campfires include a post having an upper end and an opposite, pointed lower end, a plurality of cantileverable arms slidably mountable into a cooking position, at first ends thereof, onto the first post so as to slidably journal the first post through collars rigidly mounted to the first ends, a plurality of cooking platforms mounted to corresponding second ends of the cantileverable arms, the second ends opposite the first ends, wherein each cooking platform of the plurality of cooking platforms is generally co-planar with its corresponding cantileverable arm of the plurality of cantileverable arms, a second post rigidly mounted at an end thereof perpendicularly to the first post, at a first location on the first post, the plurality of cantileverable arms, in a storage position slidably mountable, at the first ends thereof, onto the second post so as to slidably journal the second post through the collars rigidly mounted to the first ends, and so as to generally align parallel to each other the plurality of cantileverable arms and the first post, and so as to generally align co-planar to each other the cooking platforms, wherein the first location is a distance from an end of the first post generally not less than the longest of the combined lengths, a mounting member releasably mountable to the first post and over the plurality of cooking platforms when the plurality of cantileverable arms are in the storage position for releasably securing the plurality of cooking platforms to the first post.

20 Claims, 10 Drawing Sheets

U.S. PATENT DOCUMENTS

| | | | |
|---|---|---|---|
| 4,363,313 | 12/1982 | Smith | 126/9 |
| 4,393,857 | 7/1983 | Sanford | 126/9 R |
| 4,421,017 | 12/1983 | Ross | 99/449 X |
| 4,502,374 | 3/1985 | Davis | 99/448 X |
| 4,532,912 | 8/1985 | Burnside, III | 126/29 X |
| 4,538,589 | 9/1985 | Preston | 126/30 |
| 4,553,525 | 11/1985 | Ruble | 126/30 |
| 4,607,608 | 8/1986 | Alfred et al. | 126/30 |
| 4,719,898 | 1/1988 | Stanislawski | 126/9 R |
| 4,732,138 | 3/1988 | Vos | 99/450 X |
| 4,847,461 | 7/1989 | Gilmore | 99/448 X |
| 4,854,297 | 8/1989 | Shuman | 126/30 |
| 4,856,423 | 8/1989 | Burns | 99/421 H |
| 4,896,651 | 1/1990 | Kott, Jr. | 126/30 |
| 4,932,391 | 6/1990 | Bierdeman | 126/25 A |
| 4,979,490 | 12/1990 | Nudo et al. | 126/30 |
| 5,188,089 | 2/1993 | Hamilton | 126/30 |
| 5,287,844 | 2/1994 | Fieber | 126/30 |
| 5,297,534 | 3/1994 | Louden | 99/449 X |
| 5,307,797 | 5/1994 | Kleefeld | 126/30 |
| 5,320,030 | 6/1994 | Hubbard | 99/448 X |
| 5,355,867 | 10/1994 | Hall et al. | 126/30 |
| 5,447,096 | 9/1995 | Bürge et al. | 99/339 |

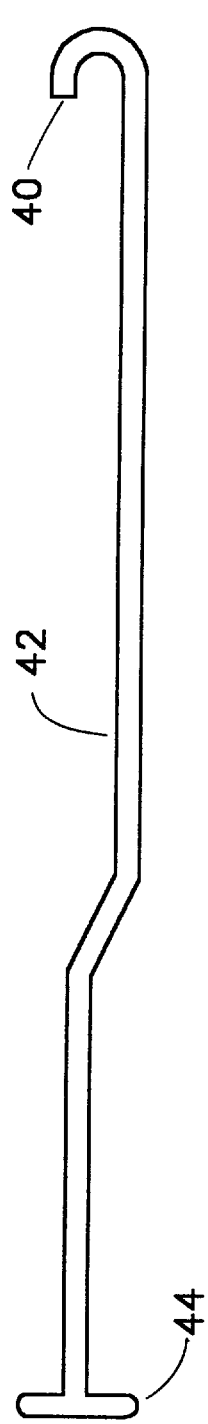
FIG. 6a
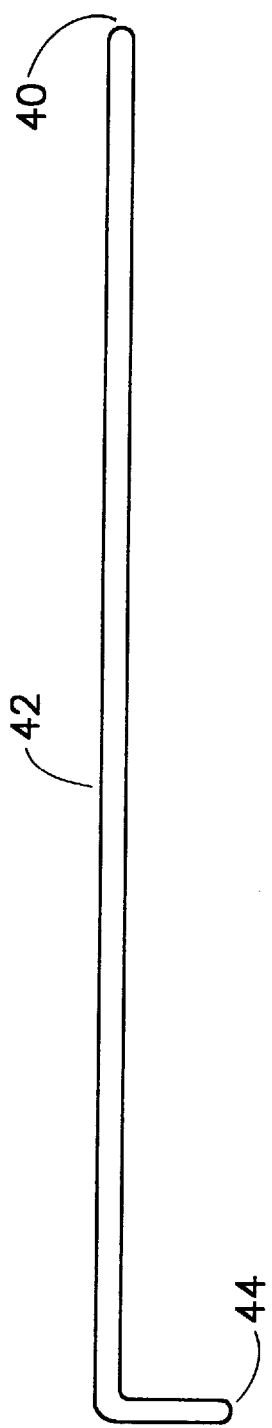
FIG. 6b
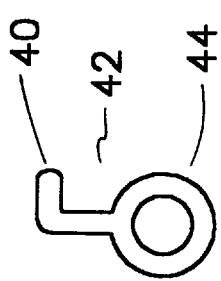
FIG. 6c
FIG. 6

U.S. Patent    Jan. 26, 1999    Sheet 8 of 10    5,862,742
FIG. 9
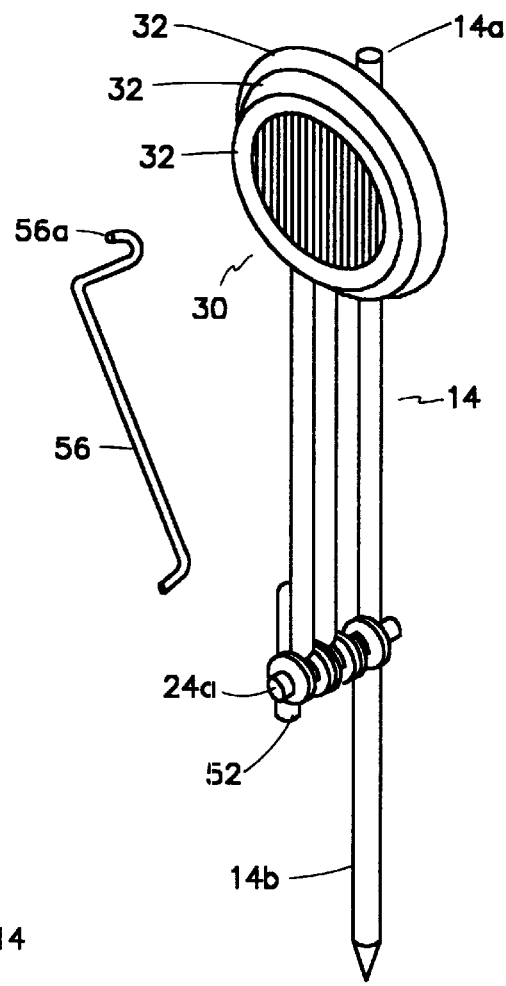
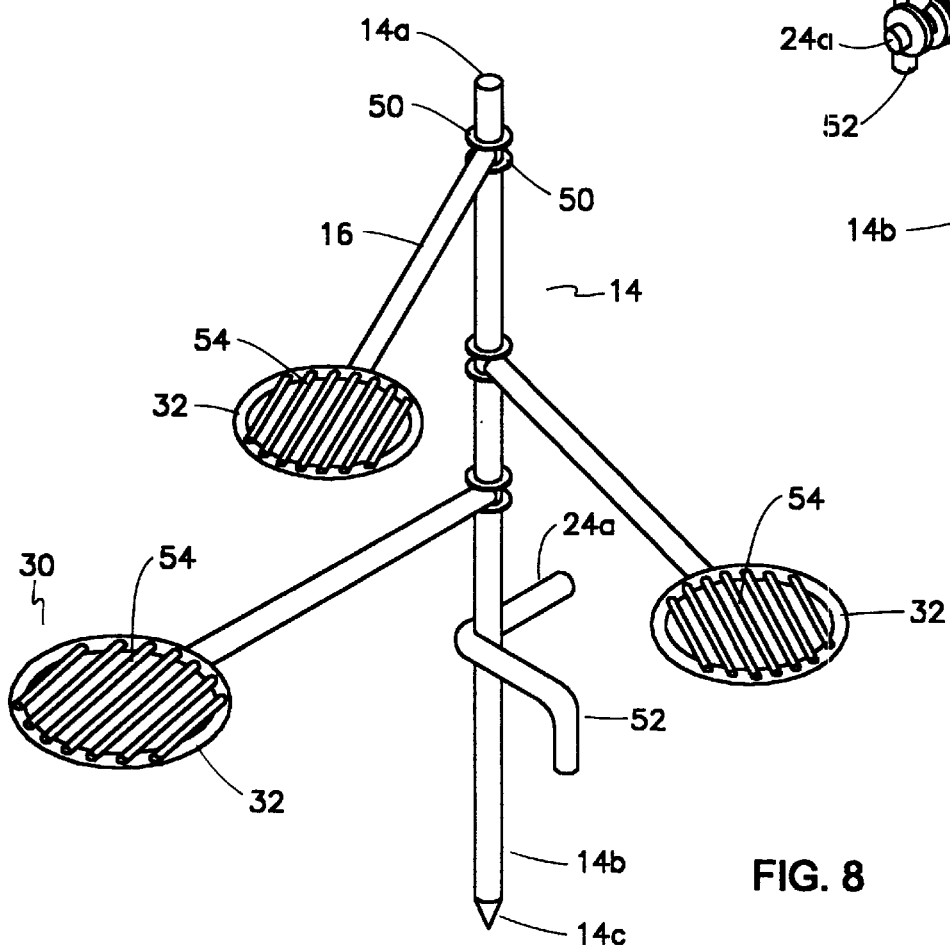
FIG. 8

CANTILEVERED COOKING GRILLS FOR CAMPFIRES

CROSS REFERENCE TO RELATED APPLICATION

This application claims priority from United States provisional patent application 60/030,822, filed Nov. 14, 1996, titled Cantilevered Cooking Grills for Campfires.

FIELD OF THE INVENTION

This invention relates to the field of post-mounted cooking and barbecue grills, and in particular, to cooking grills which are slidably mountable onto a post so as to cantilever over an open fire and to devices for the convenient portable storing of same.

BACKGROUND OF THE INVENTION

Judging from the voluminous prior art in the field of portable cooking and barbecue grills, it can be inferred that the difficulties encountered when trying to cook over an open fire, such as a camp fire, are well understood and have resulted in the prior art post-mounted cooking and barbecue grills listed below.

Generally, it is recognized in the prior art that a convenient form of supporting cooking utensils over an open fire includes a single post which may be driven into the ground adjacent the fire. Cantilevered supports are adjustably mounted to the post so that a user may adjust the height of the supports over the open fire. The supports may be rigid cantilevered arms from which may be suspended cooking utensils. The cantilevered arms may have generally planar horizontal members such as grills mounted or mountable thereto. The cantilevered arms may be pivotally mounted to the post or may be rigidly affixed, for example, generally horizontally. The post may be stabilized merely by being driven into the ground to a suitable depth, or may be stabilized by a base member rigidly mounted to the post and extending generally horizontally therefrom adjacent a lowermost end of the post, so that when the post has been driven into the ground, the base member lies flush with the ground-level surface.

In the prior art, such devices are disclosed in the following patents:

U.S. Pat. Nos.:

2,523,200 issued to Durst
2,604,884 issued to Walker
2,827,846 issued to Karkling
2,844,139 issued to Lucas
2,912,973 issued to Lucas
2,914,283 issued to Jorgenson
2,940,439 issued to Bartels
2,960,979 issued to Stone
2,974,662 issued to Forrest
2,977,953 issued to Dowdy
3,067,734 issued to Lucas
3,152,536 issued to Lucas
3,261,344 issued to Petric
3,344,780 issued to Anderson
3,395,692 issued to Johns
3,498,210 issued to O'Toole
3,526,217 issued to Garske
4,094,296 issued to Beagley
4,351,312 issued to Ivy
4,363,313 issued to Smith
4,538,589 issued to Preston -continued 4,553,525 issued to Ruble
4,607,608 issued to Allred
4,719,898 issued to Stanislawski
4,854,297 issued to Shuman
4,856,423 issued to Burns
4,896,651 issued to Kott, Jr.
4,979,490 issued to Nudo
5,188,089 issued to Hamilton
5,287,844 issued to Fieber
5,307,797 issued to Klecfeld
5,355,867 issued to Hall
5,447,096 issued to Burge
Canadian Patent Numbers:

1,170,136 issued to Connely
1,185,854 issued to Pianta
1,286,936 issued to Shuman
2,030,717 issued to Marshall What is neither taught nor suggested in the prior art, and which it is an object of the present invention to provide, is a means of conveniently storing the cantilevered arms, cooking grills and post in a unitary package so as to occupy a minimum of space and so as to minimize weight. These are, of course, important features of a utensil intended to be carried by people backpacking or otherwise those who while camping do not have the luxury of a motorized camper.

SUMMARY OF THE INVENTION

In summary, the cantilevered cooking grills for campfires of the present invention include a first post having an upper end and an opposite, pointed lower end, a plurality of cantileverable arms slidably mountable into a cooking position, at first ends thereof, onto the first post so as to slidably journal the first post through collars rigidly mounted to the first ends, a plurality of cooking platforms mounted to corresponding second ends of the cantileverable arms, the second ends opposite the first ends, wherein each cooking platform of the plurality of cooking platforms is generally co-planar with, and have a combined length with, its corresponding cantileverable arm of the plurality of cantileverable arms, a second post rigidly mounted at an end thereof perpendicularly to the first post, at a first location on the first post, the plurality of cantileverable arms, in a storage position slidably mountable, at the first ends thereof, onto the second post so as to slidably journal the second post through the collars rigidly mounted to the first ends, and so as to generally align parallel to each other the plurality of cantileverable arms and the first post, and so as to generally align co-planar to each other the cooking platforms, wherein the first location is a distance from an end of the first post generally not less than the longest of the combined lengths, a mounting member releasably mountable to the first post and over the plurality of cooking platforms when the plurality of cantileverable arms are in the storage position for releasably securing the plurality of cooking platforms to the first post.

BRIEF DESCRIPTION OF THE DRAWINGS

FIG. 6a is, in plan view, the resilient arm of the cantilevered cooking grills of FIG. 5.

FIG. 6b is, in side elevation view, the resilient arm of FIG. 6a.

FIG. 6c is, in end elevation view, the resilient arm of FIG. 6a.

FIG. 8 is, in perspective view, a third embodiment of the cantilevered cooking grills of the present invention shown in their deployed position.

FIG. 9 is, in partially exploded perspective view, the cantilevered cooking grills of FIG. 8 in their storage position.

DETAILED DESCRIPTION OF THE PREFERRED EMBODIMENT

Figure 1:
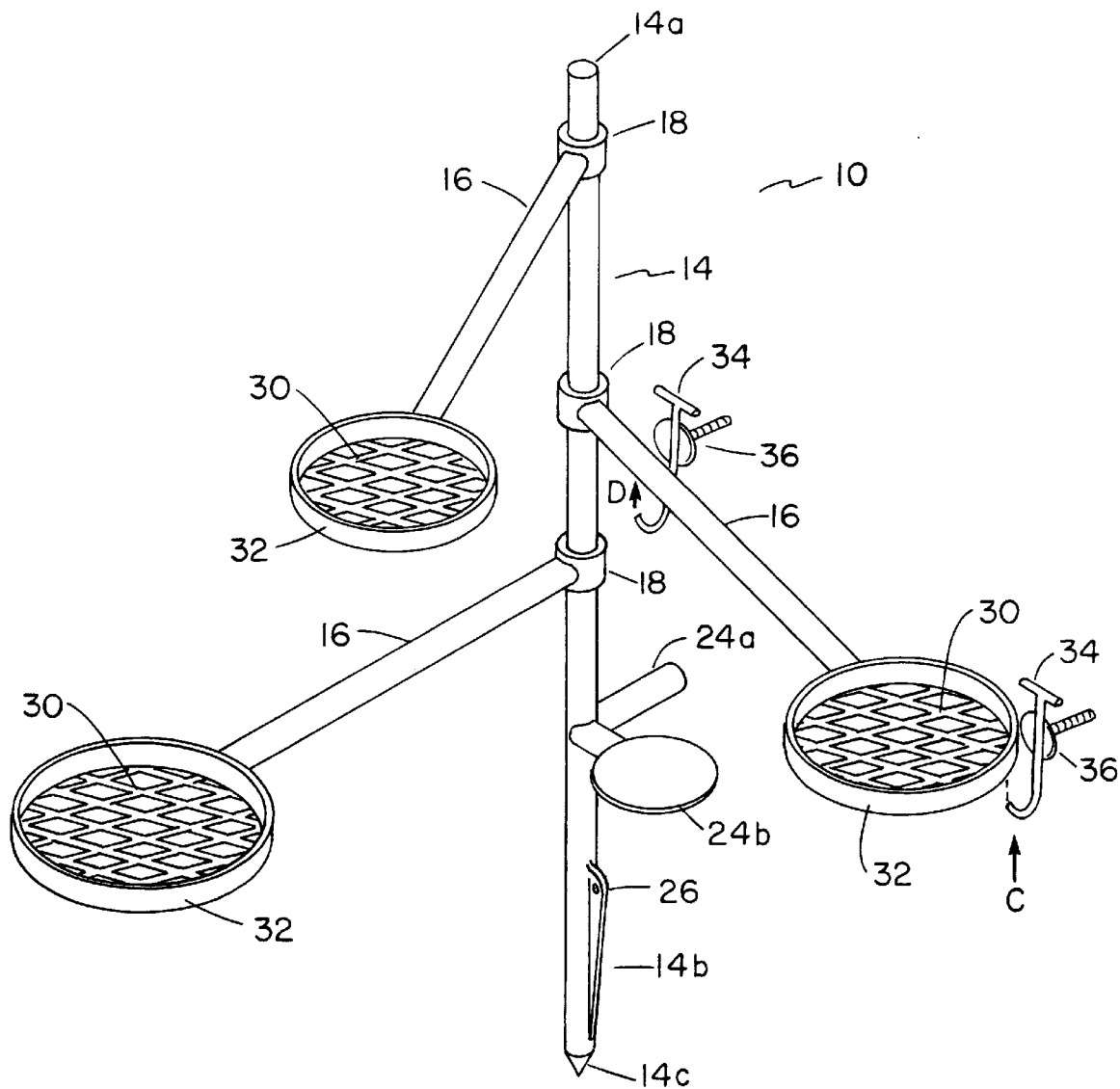
FIG. 1 is, in perspective view, a first preferred embodiment of the cantilevered cooking grills of the present invention.
Figure 2:
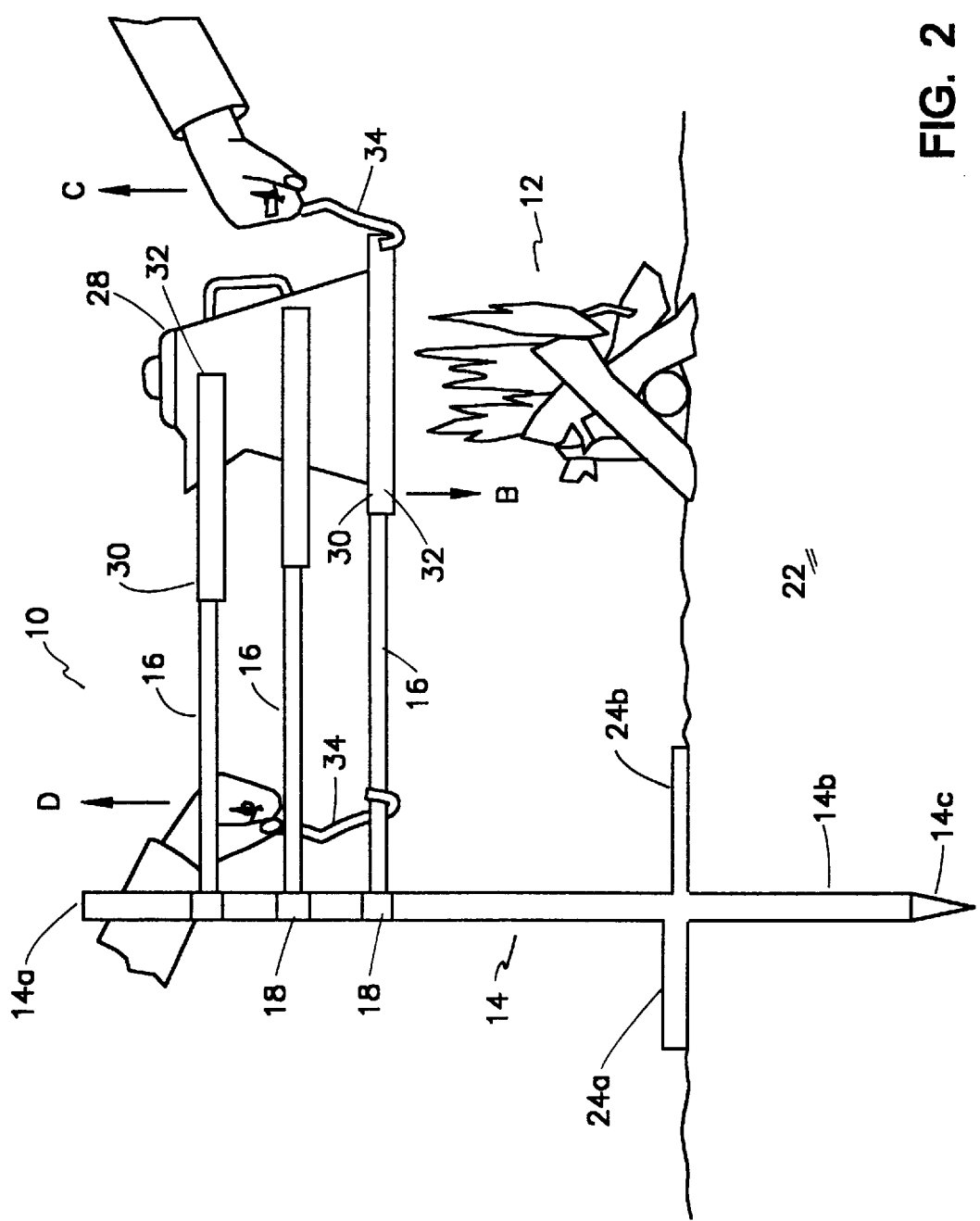
FIG. 2 is, in side elevation view, the cantilevered cooking grills of FIG. 1 shown inserted into the ground so as to cantilever the grills over an open fire.
Figure 3:
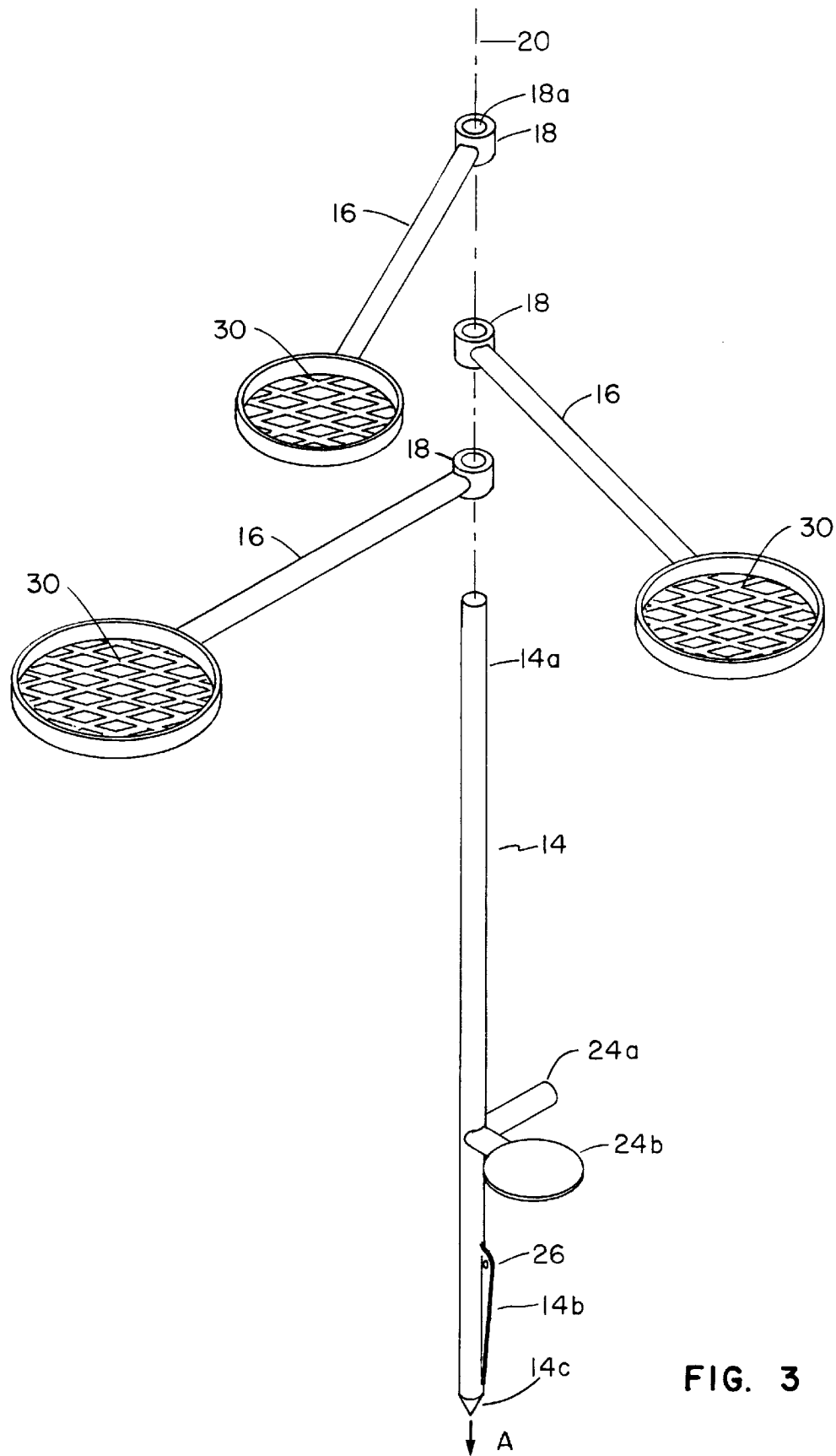
FIG. 3 is, in exploded view, the cantilevered cooking grills of FIG. 1.

As illustrated in the accompanying Figures, cantilevered cooking grills 10 may be disposed over open fire 12 by means of a generally vertically extending elongate rigid stake or post member 14. A plurality of cantilevered cooking arms 16 are provided. Three cooking arms are illustrated, but it is understood that two or more may be employed within the scope of this invention. The cooking arms are releasably slidably mountable onto elongate member 14 by means of snug fitting collar 18 rigidly mounted at a first end of cantilevered cooking arm 16. Elongate member 14 may be snugly journalled through aperture 18a in collar 18 along longitudinal axis 20. Advantageously the plurality of cantilevered cooking arms 16 may be selectively positioned vertically and radially about member 14 so as to be radially spaced apart.

In a first preferred embodiment, cantilevered cooking arms 16 are releasably slidably mountable onto an upper end 14a of elongate member 14, and at least the upper end 14a of elongate member 14 is cylindrical, as by a cylindrical rod, pole or shaft, along axis 20. A lower end 14b of elongate member 14 is preferably adapted for releasable insertion as by pointed end 14c in direction A, into ground material, such as earth 22. Once so inserted, lower end 14b is adapted to provide a stable base, such as by stabilizing members 24a and 24b and fin 26 rigidly projecting at right angles to axis 20.

Stabilizing members 24a and 24b and fin 26 assist in resisting torsional rotation of elongate member 14 about axis 20 due to adjustment of the radial spacing of cantilevered cooking arms 16, and the bending moment acting on elongate member 14 due to cantilevered cooking arms 16, especially when cooking implements 28 are supported on second ends, opposite to the first ends, of cooking arms 16, as by cooking platforms 30.

In one aspect platforms 30 may be generally horizontal rigid grills having perforations, bars or like cross-members, rigidly mounted as by welding to raised circumferential rims 32, where circumferential rims 32 are rigidly mounted as by welding to the second ends of cantilevered cooking arms 16.

In a further aspect cantilevered cooking arms 16 are positionable on, and relative to, elongate member 14 by reason of the snug fit of collars 18 on upper end 14a, wherein the snug fit does not resist relative movement along axis 20 when cooking arms 16 are held perpendicular to axis 20, but wherein relative movement along axis 20 is resisted when cooking arms 16 are held or allowed to droop, as for example in direction B, off the perpendicular to axis 20 so as to bind elongate member 14 in aperture 18a in collars 18. Thus it may be seen that vertical or radial positioning of cooking arms 16 on elongate member 14 may be accomplished by positioning means, such as J-hook 34. J-hook 34 may be manually applied to cooking arms 16 or circumferential rims 32 or the like so as to elevate, in a direction opposite direction B, cooking arms 16 to the horizontal, and in particular so as to rotate collars 18 to align apertures 18a with axis 20 so as to unbind elongate member 14.

It has been found that applying J-hook 34 to rims 32 so as to initially lift rims 32 in direction C allows lowering in direction B of the entire cantilevered assembly so as to reposition cooking arms 16 downwardly on elongate member 14. Repositioning cooking arms 16 upwardly is advantageously accomplished by applying J-hook 34 to cooking arms 16 relatively close to collars 18 and lifting in direction D. Resilient arm 42 or hook member 56, better described below, may be used in a fashion similar to J-hook 34.

Figure 4:
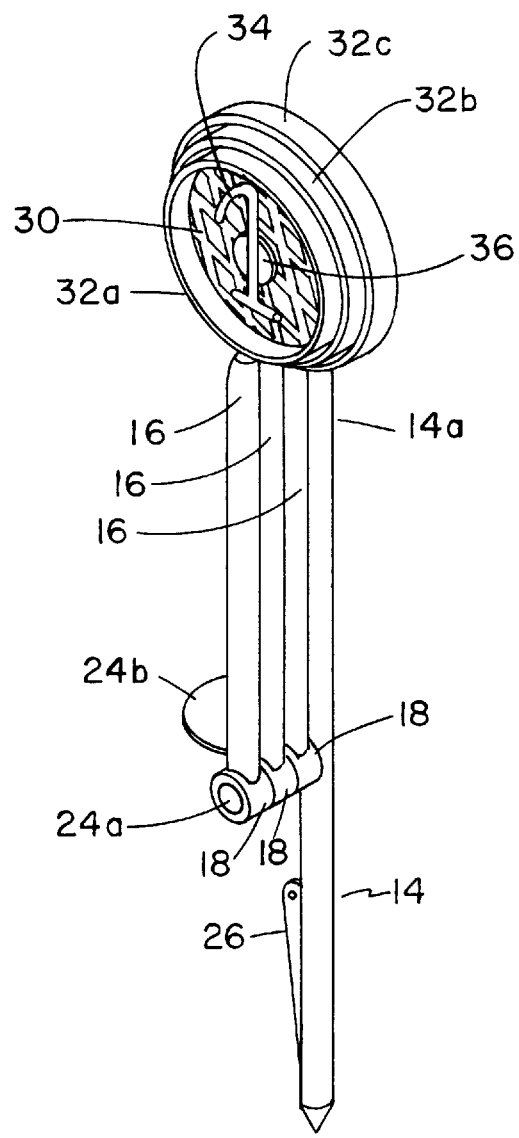
FIG. 4a is, in perspective view, the cantilevered cooking grills of FIG. 1 in their storage position.

In a further aspect of the present invention, cooking arms 16 may be removed from elongate member 14 by sliding collars 18 upwardly from upper end 14a, and cooking arms 16 may then be conveniently stored by releasable mounting onto, and parallel with, elongate member 14 as best seen in FIG. 4. Advantageously stabilizing member 24a is of similar, or slightly larger diameter as upper end 14a of elongate member 14 so that collars 18 may be snugly, or tightly, journalled thereon.

Further advantageously rims 32 are of different diameters for concentric nested fitment of one rim 32 within another, as for example by the nested fitment of rim 32a within rim 32b within rim 32c. The concentric nested fitment of rims 32 within one another brings cooking platforms 30 into close parallel adjacency and closely adjacent upper end 14a of elongate member 14.

In one preferred embodiment, a corresponding aperture, such as a corresponding hole in the apertured grill surface of cooking platforms 30, is provided on all cooking platforms 30 so that when rims 32 are in concentric nested fitment, the corresponding apertures are all aligned, and preferably all aligned with elongate member 14, so that a releasable securing means such as bolt 36, may be passed through the corresponding apertures and releasably secured to elongate member 14, as for example by screwing bolt 36 into a corresponding threaded bolt hole (not shown) on elongate member 14. It has been found advantageous to mount bolt 36 perpendicularly to J-hook 34 so that J-hook 34 is necessarily secured when cooking arms 16 are stowed against elongate member 14. J-hook 34 also provides convenient means for tightening and loosening bolt 36 in the bolt hole on elongate member 14. J-hook 34 may be of any other convenient shape affording a means for releasably gripping or hooking the cantilevered assembly.

As may be seen in FIGS. 1–4, stabilizing member 24b may advantageously be a planar, generally horizontal disc or like weight-distributing means for applying pressure to the surface of earth 22 without excessively sinking into earth 22. Fin 26 may be any manner of fin or fins or arrow-head or like ground anchor or may be a corkscrew spiral arrangement.

Figure 5:
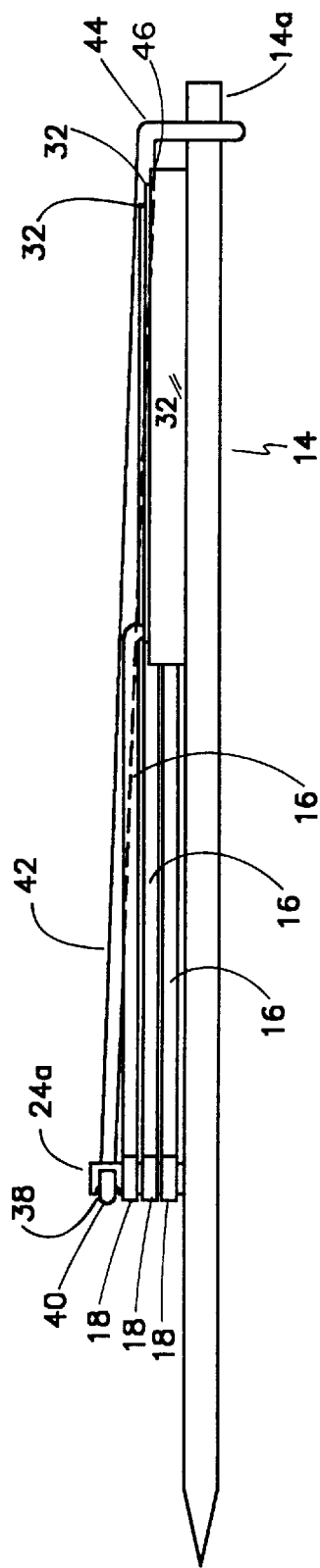
FIG. 5 is, in side elevation view, a second preferred embodiment of the cantilevered cooking grills of the present invention in their storage position.
Figure 7:
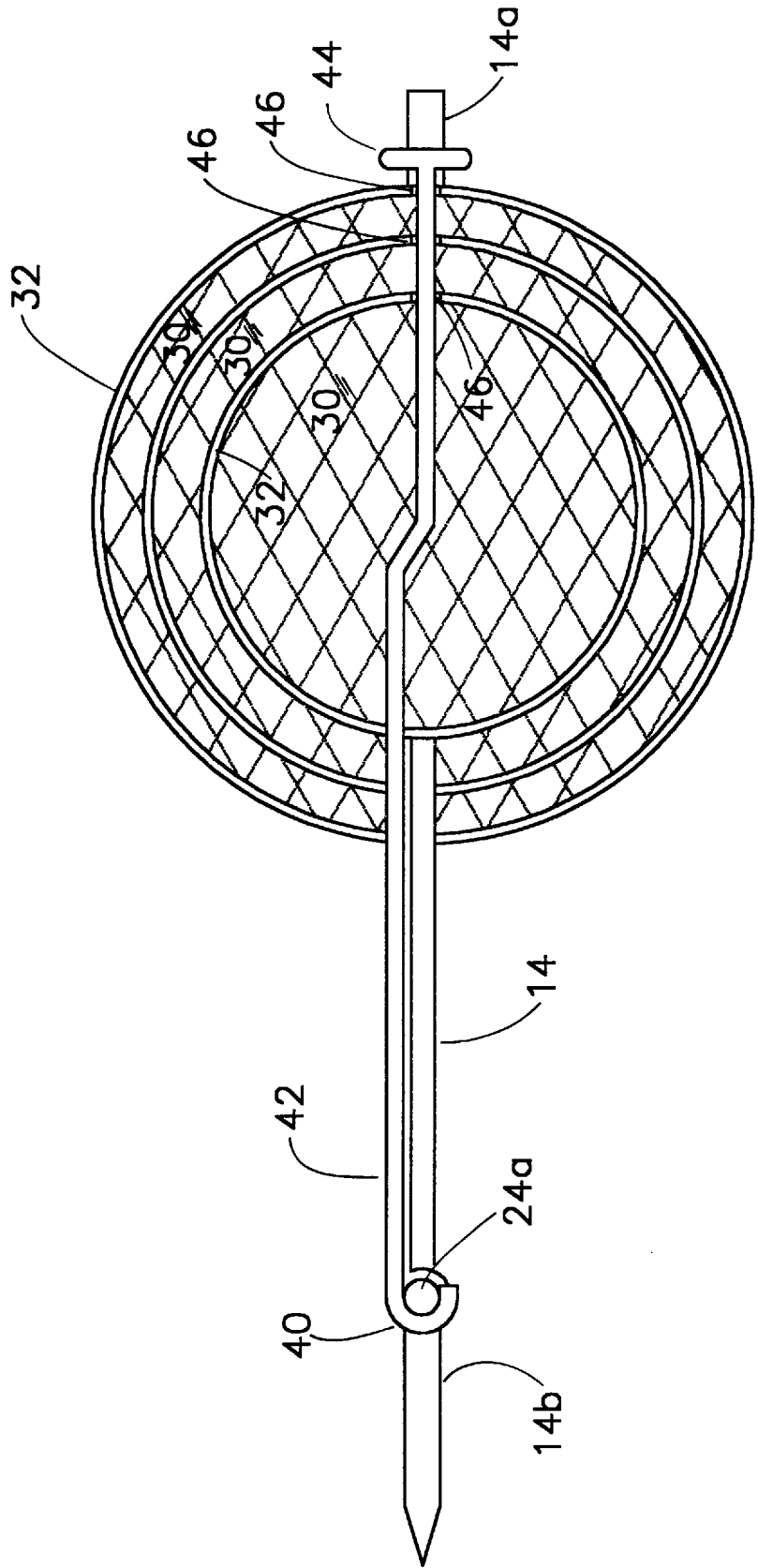
FIG. 7 is, in plan view, the cantilevered cooking grills of FIG. 5.
Figure 10:
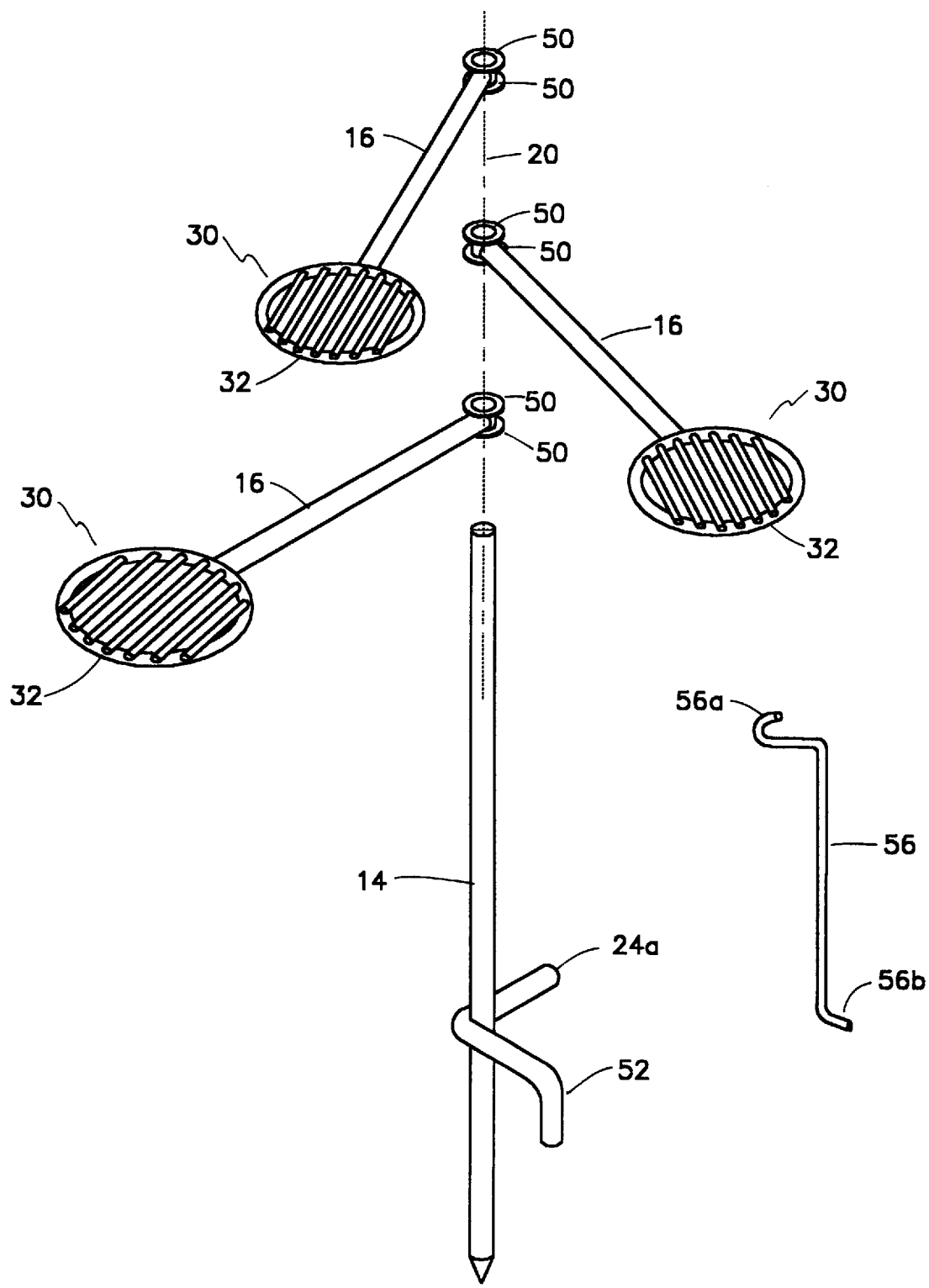
FIG. 10 is, in exploded perspective view, the cantilevered cooking grills of FIG. 8.

In an alternative embodiment as seen in FIGS. 5–7, member 24a extends in an extension slightly beyond collars 18 when they are mounted on member 24a. The extension of member 24a is notched so as to receive in releasable mating engagement in notch 38 a hook 40 formed in one end of resilient arm 42. Collar 44 is formed in the opposite end of resilient arm 42 and disposed generally perpendicularly to resilient arm 42 so that, with collar 44 slid onto upper end 14a of elongate member 14, resilient arm 42 may be laid over or resiliently bent over cooking platforms 30 when rims 32 are in concentric nested fitment adjacent elongate member 14 and hook 40 releasably hooked into notch 38 (dotted outline in FIG. 5) to thereby secure cooking platforms 30, cooking arms 16 and collars 18 on member 24a. Advantageously, resilient arm 42 registers with alignment notches 46 formed in rims 32.

In a further alternative embodiment, as seen in FIGS. 8–12, collars 18 have been replaced by opposed pairs of washers 50 welded to cooking arms 16, and stabilizing member 24b and fin 26 have been replaced by L-shaped ground anchor 52. Cooking platforms 30 and raised circumferential rims 32 have been inverted and the perforated grill work replaced with cross members or bars 54. Again, as seen in FIG. 9, rims 32 are sized so that in their storage position, they are snugly concentrically nested one inside the other against end 14a of member 14. In the storage position, washers 50 are slidably snugly or tightly journalled over stabilizing member 24a.

Figure 11:
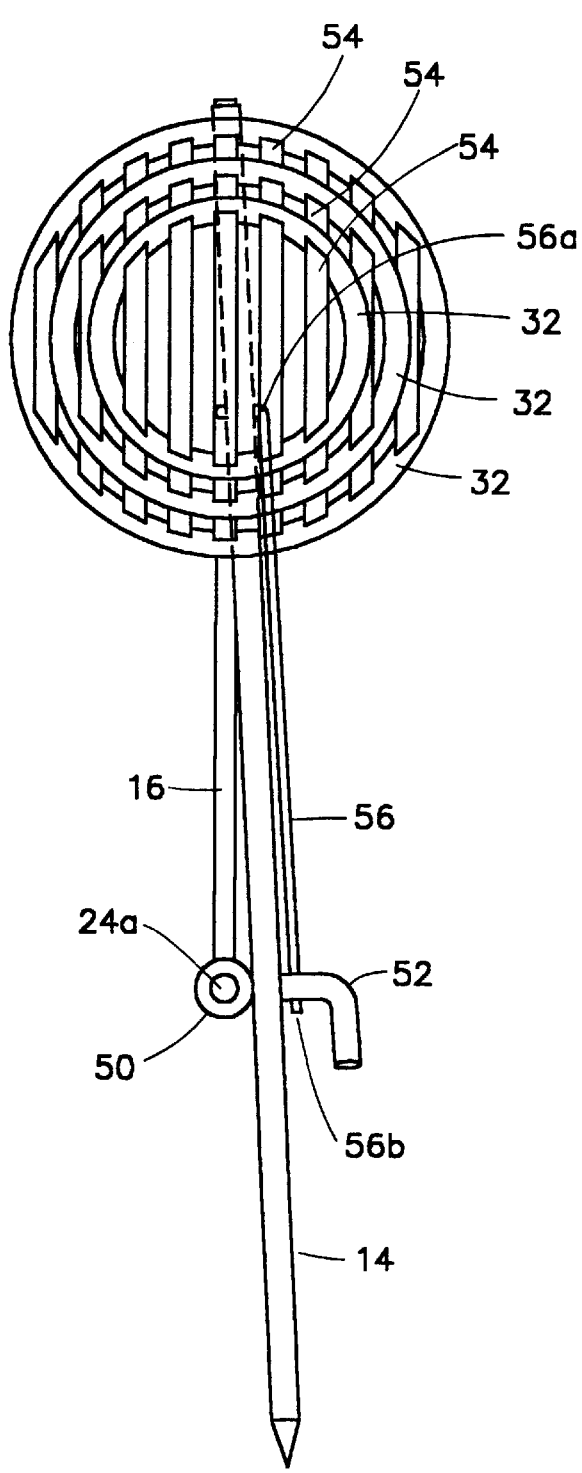
FIG. 11 is, in plan view, the cantilevered cooking grills of FIG. 9.
Figure 12:
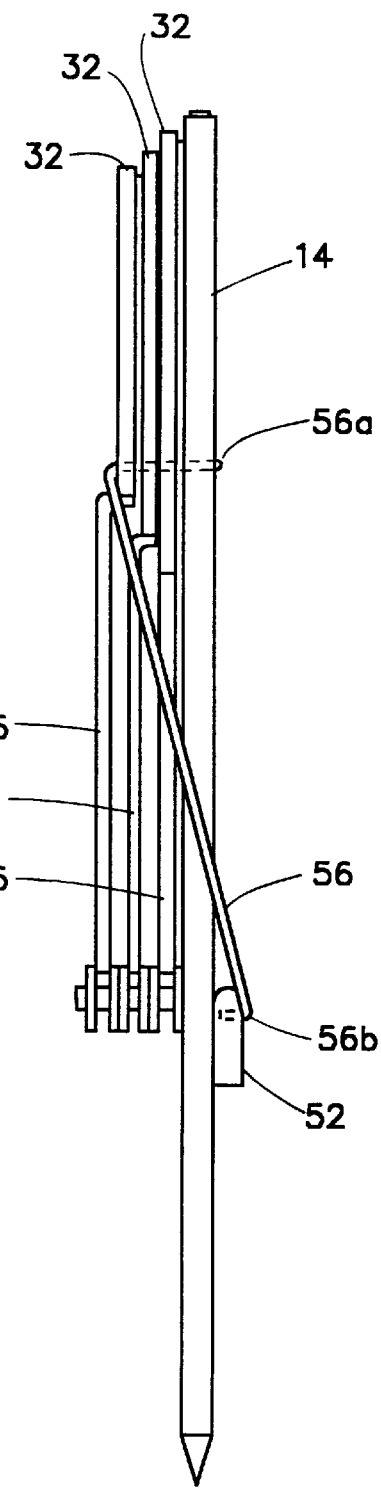
FIG. 12 is, in side elevation view, the cantilevered cooking grills of FIG. 9.

J-hook 34 is replaced with resilient hook member 56 shown in FIG. 9 in exploded view detached from the device in, otherwise, its storage position. As best seen in FIGS. 11 and 12, first hook 56a of hook member 56 is passed between cross members 54 so as to hook under member 14. An elongate section of hook member 46 extends between first hook 56a and second hook 56b at the opposite end of member 56. Second hook 56b hooks behind ground anchor 52 to thereby tension the elongate section of hook member 56 over rims 32. Hook member 56 is advantageously of stainless steel wire.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Cantilevered cooking grills for campfires, comprising:
   a first post having an upper end and an opposite, pointed lower end,
   a plurality of cantilevered arms slidably mountable into a cooking position, at first ends thereof, onto said first post so as to slidably journal said first post through collars rigidly mounted to said first ends, a plurality of cooking platforms mounted to corresponding second ends of said cantileverable arms, said second ends opposite said first ends,
   wherein each cooking platform of said plurality of cooking platforms is generally co-planar with, and have a combined length with, its corresponding cantileverable arm of said plurality of cantileverable arms,
   a second post rigidly mounted at an end thereof perpendicularly to said first post, at a first location on said first post, said plurality of cantileverable arms, in a storage position slidably mountable, at said first ends thereof, onto said second post so as to slidably journal said second post through said collars rigidly mounted to said first ends, and so as to generally align parallel to each other said plurality of cantileverable arms and said first post, and so as to generally align co-planar to each other said cooking platforms,
   wherein said first location is a distance from an end of said first post generally not less than the longest of said combined lengths,
   a mounting member releasably mountable to said first post and over said plurality of cooking platforms when said plurality of cantileverable arms are in said storage position for releasably securing said plurality of cooking platforms to said first post.

2. The device of claim 1 wherein said collars define a cavity sized to snugly fit around said first and second posts, and wherein said cavity has a first dimension from a first end of said cavity to an opposite second end of said cavity,
   and wherein the length of said second post generally corresponds to the sum of said first dimensions of said collars of said plurality of cantileverable arms.

3. The device of claim 2 wherein said first location on said first post is set back from said pointed lower end so as to allow driving said pointed lower end into ground until said second post contacts said ground, when said plurality of cantileverable arms have been removed from said storage position.

4. The device of claim 3 wherein said plurality of cooking platforms are sized for nested stacking one on top of another.

5. The device of claim 4 wherein said plurality of cooking platforms are grills having raised circumferential edges, concentrically stackable in said storage position so as to stack said raised circumferential edges concentrically, one on top of another, with grills having a smaller circumferential diameter nested within grills having a larger circumferential diameter.

6. The device of claim 5 wherein said mounting member is a resilient hook member shaped to be passed through apertures in said grills when in said storage position so as to releasably clamp said grills against said first post and so as to support said grills laterally, relative to a longitudinal axis of said first post.

7. The device of claim 6 further comprising a rigid base member rigidly mounted to said first post, generally adjacent said pointed lower end, so as to extend perpendicularly from said first post.

8. The device of claim 7 wherein said rigid base member is an elongate arm having, at an end distal from said first post, a ground anchor rigidly extending downwardly therefrom generally parallel and pointing in the same direction as said pointed lower end.

9. The device of claim 8 wherein said rigid base member and said ground anchor from an "I"-shape.

10. The device of claim 9 wherein said rigid base member and said second post are co-planar.

11. The device of claim 10 wherein said rigid base member and said second post are orthogonal.

12. The device of claim 6 wherein said resilient hook member is a resilient wire member having a first hook for passing through said aperture in said grills, when said grills are in said storage position, into releasable hooked engagement with said first post, an elongate section mounted at a first end thereof to said first hook, a second hook mounted to a second end, opposite said first end, of said elongate section for releasably tensioning said resilient hook member over said grills so as to releasably clamp said grills onto said first post.

13. The device of claim 12 wherein said second hook may be releasably hooked onto a rigid base member rigidly mounted to said first post.

14. The device of claim 1 wherein said mounting member is a bolt for passing through apertures in said plurality of cooking platforms into releasable threaded engagement with a corresponding threaded cavity in said first post.

15. The device of claim 14 wherein said bolt is formed as a J-shaped hook at an end opposite a threaded end of said bolt.

16. The device of claim 1 wherein said mounting member is a clamp arm for releasable clamping over said plurality of cooking platforms in said storage position.

17. The device of claim 16 wherein said clamp arm has a collar at one end for sliding fitment over said upper end of said first post, and a hook at its opposite end.

18. The device of claim 17 wherein said clamp arm is resilient.

19. The device of claim 18 wherein said hook releasably engages a hook receiving notch in said second post.

20. The device of claim 19 wherein said hook receiving notch is in a distal end of said second post, distal from said first post.

* * * * *